Patented Mar. 17, 1925.

1,530,359

UNITED STATES PATENT OFFICE.

JOHN H. DEPPELER, OF WEEHAWKEN, NEW JERSEY, ASSIGNOR TO METAL & THERMIT CORPORATION, OF CARTERET, NEW JERSEY, A CORPORATION OF NEW JERSEY.

CRUCIBLE FOR EXOTHERMIC AND LIKE REACTIONS.

No Drawing.    Application filed February 9, 1925. Serial No. 8,528.

*To all whom it may concern:*

Be it known that I, JOHN H. DEPPELER, a citizen of the United States, and a resident of Weehawken, in the county of Hudson and State of New Jersey, have invented certain new and useful Improvements in Crucibles for Exothermic and like Reactions; and I do hereby declare the following to be a full, clear, and exact description of the invention, such as will enable others skilled in the art to which it appertains, to make and use the same.

The invention relates to an improvement in crucibles and similar receptacles for use in effecting reduction of metals by means of metallic reducing agents, and more especially for effecting exo-thermic reactions in which metal and slag are generated, as for example the well known thermit process, in which various ores and oxides are reduced by means of aluminum; the invention also finding efficacious application to similar reduction processes, wherein other elements, such as silicon, manganese, etc., are employed as reducing agents and from which fluid slags result.

It has been customary in effecting exothermic reactions, as for example thermit welding and similar operations, to employ cricubles provided with the most refractory linings, the material best suited for the purpose being magnesite, which is used in its dead burned condition with anhydrous tar as a binder. In applying the linings the mixture of magnesite and tar was usually rammed into a sheet iron shell to form an interior coating or lining of an inch or more in thickness. The shell with its lining was then baked, and the lining formed a hard, resisting, refractory coating which would withstand the extremely high temperatures of exo-thermic and similar reactions for a considerable length of time, the smaller sizes of crucibles, so lined, being available for 30 or more charges, while the larger sizes of crucibles would serve effectively for only relatively few charges, after which the lining which had been gradually washed away or eroded by the highly heated molten products of the reaction, had to be knocked out and the shell relined. Various other materials such as carborundum, carborundum fire sand, silica and the like have been employed in making up refractory linings for crucibles of this character, but when the lined crucibles were employed in effecting the exo-thermic reduction of steel, the material of the lining was found to injuriously contaminate the steel by the introduction therein of silicon, carbon etc. Magnesite has given, therefore, the best results as a lining material, and has been most generally employed, especially in exothermic reactions involving the production of molten steel, as that part of the lining that is eroded by the high heat enters the slag, leaving the steel free from contamination. Because of the relatively short life of the refractory linings, as heretofore employed, and the necessity of frequent renewals, extensive investigations have been made for the purpose of developing a crucible, or a crucible lining material, which would withstand the high heat produced by the reactions of the character indicated, and the present invention is predicated upon the discovery that a crucible or similar receptacle made of metal, preferably steel or iron, solves the difficulty and avoids the objections incident to the use of refractory lined crucibles, the effectiveness of the metal crucibles being due to the fact that the highly heated molten slag, resulting from reaction of the character indicated, evidences a strong affinity for metallic surfaces, and adheres to the same with great tenacity, and protects the surfaces from the melting or eroding effect of the molten metal resulting from the reaction.

In the case of the thermit reaction, the mixture of iron oxide and aluminum is ignited in one spot, and reaction propagates throughout the mass with great rapidity, so that within 20 or 30 seconds the entire mass has reacted, forming molten iron or steel and molten alumina slag. These materials separate from each other rapidly and, in fact almost as soon as they are formed, because of the great difference of their specific gravities. The slag is formed in all parts of the reacting mass and in separating from the molten metal, a considerable portion of the molten slag of the charge comes in contact with the interior surface of the crucible, and because of the tendency of the same to adhere to a metallic surface, if the crucible be made of metal, preferably steel or iron, the molten slag will immediately form a surface coating thereon and protect the metal of the crucible from the deleterious effects of the molten metal. It has been found that a simple metal crucible, or a crucible with a metallic lining, will be thoroughly and completely protected by the slag formed in the reaction, so that the latter may be carried out directly in the metallic crucible and the resultant steel and slag tapped from it without impairment to the crucible.

In designing a crucible of the character indicated, it is necessary to provide sufficient thickness of the metal walls as to enable the heat of the reaction to be conducted away from the inner surface of the wall rapidly enough to prevent such inner surface being actually melted and, with such a crucible, there is absolutely no need for a lining of any kind, except the slag lining that is formed during the reaction. The maintenance of a relatively cool inner surface of the crucible wall, due to the dissipation of the heat by the metal wall, will immediately effect a chilling of the thin layer of slag deposited on the wall, said slag layer setting up into a pasty condition and preventing further contact between the highly molten metal and the inner wall of the crucible. Although this slag coating is usually very thin, probably in the neighborhood of $\frac{1}{16}$ of an inch, nevertheless it is seemingly a sufficiently poor conductor to prevent the melting of the inner wall of the crucible by the heat generated in the reaction mass within the crucible. No hard and fast rule to determine the thickness of the crucible walls can be made, but a more or less general rule is that the thickness of the crucible walls is such as to provide sufficient metal to conduct away enough heat to prevent melting or fusion of the inner surface of the wall through the nonconducting slag coating formed in the reaction and deposited on said surface. As a general proposition, it is desirable to make the walls of the crucible a little thicker than the application of this general rule would require. A practical crucible complying with the conditions of the rule and which has been used for some 240 reactions without evidencing any impairment, and is still in active service, has the following general shape and dimensions:

Form: Frusto-conical.
Over-all height: 13½".
Inside diameter at top: 10½".
Inside diameter at bottom: 1⅜".
Wall thickness: 1$\frac{1}{16}$" at all points.
Capacity: Approximately 15 lbs. of thermit.
Material: Ordinary cast steel.

This particular crucible after its long period of use shows practically no impairment, although it has, in several instances, been subjected to the severest possible tests, in which the entire reaction mass has been allowed to freeze or solidify in the crucible, the heat of the reaction being gradually dissipated through the walls, heating the latter to redness at or about the mid height of the vessel, but in no wise impairing the metal fabric. After the mass within the crucible had cooled, it was knocked out without injury to the crucible.

Such metallic crucibles have been employed extensively with uniformly good results, and it is found that the crucibles gradually acquire a lining or interior coating of adherent slag, and when after a number of reactions this slag was knocked out, the crucible was found to be in practically the same condition as when originally made and will serve its intended purpose indefinitely without impairment. An obvious advantage of the crucible formed of metal such as steel, is that it may be roughly handled without injury, whereas the old types of crucibles lined with magnesite or other refractory materials required the most careful handling under all circumstances, to avoid cracking or otherwise damaging the lining. The new crucible may, of course, be made in any of the preferred or desired forms or shapes employed in operations involving the exo-thermic or similar reactions, such as the flat bottom type, or that with a tap hole in the bottom. When the latter type is used the crucible may be provided with a replaceable magnesite form at the bottom, out of which the thermit steel is tapped, which form is the same as that now used in the magnesite lined crucible and which protects the spout of the crucible from the wash of the highly superheated thermit steel during the tapping operation.

What I claim is:

1. A receptacle for use in effecting the reduction of metals by means of metallic reducing agents comprising a metal crucible of sufficient wall thickness to chill on its inner surface a thin layer of slag produced by the reaction.

2. A receptacle for use in effecting exothermic reactions comprising an initially unlined metal crucible of sufficient wall thickness to chill on its inner surface a thin layer of slag produced by the reaction.

3. A receptacle for use in effecting exothermic reactions comprising a metallic crucible of sufficient wall thickness to convey away sufficient of the heat of reaction to prevent fusion of its inner surface, said crucible having a lining of slag produced by the reaction.

In testimony whereof I affix my signature.

JOHN H. DEPPELER.

DISCLAIMER.

1,530,359.—*John H. Deppeler*, Weehawken, N. J. CRUCIBLES FOR EXOTHERMIC AND LIKE REACTIONS. Patent dated March 17, 1925. Disclaimer filed May 2, 1925, by the patentee, the assignee *Metal & Thermit Corporation*, consenting.

Hereby enters his disclaimer to all of the claims of said Letters Patent, which are as follows, to wit:

"1. A receptacle for use in effecting the reduction of metals by means of metallic reducing agents comprising a metal crucible of sufficient wall thickness to chill on its inner surface a thin layer of slag produced by the reaction.

"2. A receptacle for use in effecting exothermic reactions comprising an initially unlined metal crucible of sufficient wall thickness to chill on its inner surface a thin layer of slag produced by the reaction.

"3. A receptacle for use in effecting exothermic reactions comprising a metallic crucible of sufficient wall thickness to convey away sufficient of the heat of reaction to prevent fusion of its inner surface, said crucible having a lining of slag produced by the reaction."

[*Official Gazette May 19, 1925.*]